Dec. 8, 1953  A. P. FREEMAN  2,661,678
TEAPOT SET
Filed Oct. 2, 1948
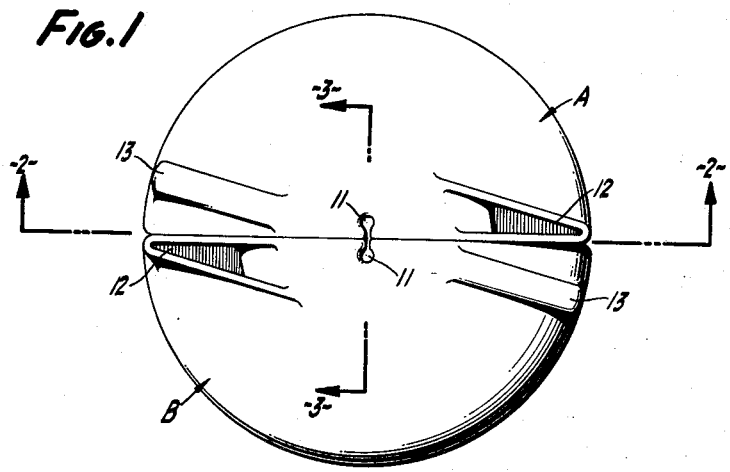
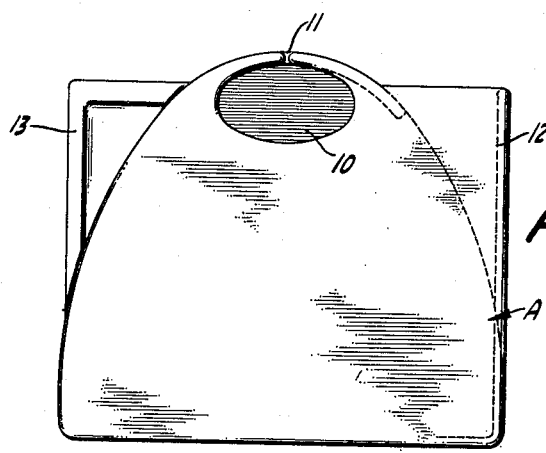
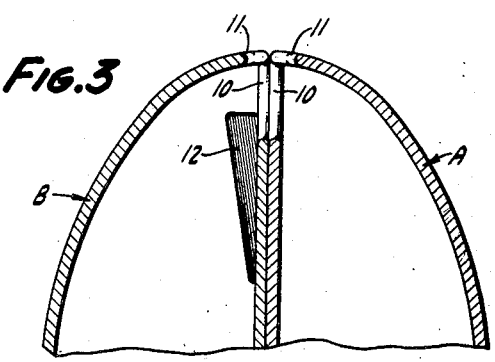
INVENTOR.
ANTONY P. FREEMAN
BY
ATTORNEYS Patented Dec. 8, 1953

2,661,678

UNITED STATES PATENT OFFICE 2,661,678

TEAPOT SET

Antony P. Freeman, San Francisco, Calif.

Application October 2, 1948, Serial No. 52,449

2 Claims. (Cl. 99—295)

The present invention relates to small containers of the class used for dining table service and more specifically to containers of the pitcher or teapot type having a handle and spout.

In table service of accompanying liquids, as, for instance, hot tea and hot water, it is customary to provide one conventional teapot for each liquid, each having its own lid, and the two occupying double the space of one alone on a plate or tray. Teapot lids tend to fall off when the liquid is poured, and are subject to frequent loss and breakage. Also, service of two pots usually requires use of a special tray occupying double the table space of one pot.

The objects of this invention are to provide multiple containers or teapots occupying substantially the same tray space as one conventional teapot of similar form and to so construct and relate the pots as to obviate any necessity for lids. Another object is to minimize the radiation of heat from the pots. Other objects and advantages of the invention will appear from the following description of one preferred embodiment of the invention illustrated on the accompanying drawing, where, Figure 1 is a top view of twin pot units in assembled relation;

Figure 2 is a side elevation of one unit as seen from its inner or contacting side after separation on line 2—2 of Figure 1; and Figure 3 is a partial vertical sectional view on line 3—3 of Figure 1.

In the species here disclosed the novel structure consists of provision of a set consisting of two identical pots A and B, each formed with one flat vertical side wall designed to contact with the wall of its opposite unit, as seen in Figures 1 and 3. The twin pots are here shown as each consisting of a body having the general shape of the quarter of an ovoid. At the apex of the inner, or contacting, wall each pot is provided with a filling opening 10 and these openings preferably register, as shown in Figure 3, when the pots are assembled or mated. At the upper edge of each opening there is a short key-hole slot 11 formed in the integral top of the pot, adapted to receive the cord of a tea bag. Each pot is provided with a spout 12 and an oppositely located handle, or lifting ear 13, which are positioned adjacent the planes of the flat side walls to obtain proper balance for the individual units when lifted and are symmetrically disposed on the assembled units.

With the twin pots constructed and assembled as disclosed, the joined semi-circular bases will fit on a conventional small round plate for service and no lids are involved as the openings 10 will mutually be closed to the outer air. At the same time the mating walls and openings will tend to conserve heat in the contained liquids as will the generally spherical conformation of the outer surfaces which afford a minimum of surface exposed to the air. The cord of a tea bag in either of the pots will be retained in slot 11 and will be prevented by the usual end-tag from falling into the pot. Slight separation of the pots will permit removal of the bag through opening 10.

It will be obvious that variations in the shape or location of parts disclosed may be made without departure from the scope of the invention as defined in the following claims.

What is claimed is:

1. A twin pot set consisting of identical halves formed with flat inner walls and contacting each other in a vertical plane, said walls being provided with registering filling openings in the upper portions thereof, and a cord slot formed in the top of each half and communicating with said openings.

2. A pot set unit having a body including an integral top and a vertical side wall, said wall being formed with a filling opening adjacent said top and said top being formed with a key-hole slot at the upper margin of said opening.

ANTONY P. FREEMAN.

References Cited in the file of this patent

UNITED STATES PATENTS

| Number | Name | Date |
|---|---|---|
| 358,019 | Curtis et al. | Feb. 22, 1887 |
| 997,060 | Hedrich | July 4, 1911 |
| 1,886,415 | Mitchell | Nov. 8, 1932 |
| 2,376,855 | Hanley | May 29, 1945 |

FOREIGN PATENTS

| Number | Country | Date |
|---|---|---|
| 3,725 | Great Britain | of 1911 |
| 10,453 | Great Britain | of 1892 |
| 380,523 | Germany | Oct. 27, 1923 |